Sept. 25, 1923.
L. E. JONES ET AL
DRAFT GAUGE
Filed March 20, 1920
1,468,948
2 Sheets-Sheet 1
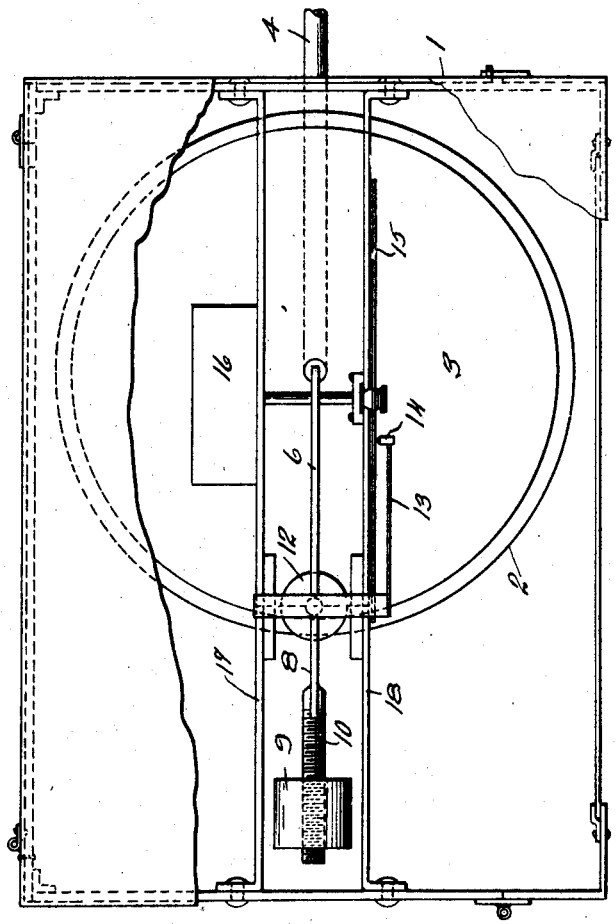
Inventors:
Laban Ellsworth Jones,
Charles Roswold Wraith,
By Byrnes, Townsend & Brickenstein
Attorneys Sept. 25, 1923.  L. E. JONES ET AL  1,468,948
DRAFT GAUGE
Filed March 20, 1920   2 Sheets-Sheet 2
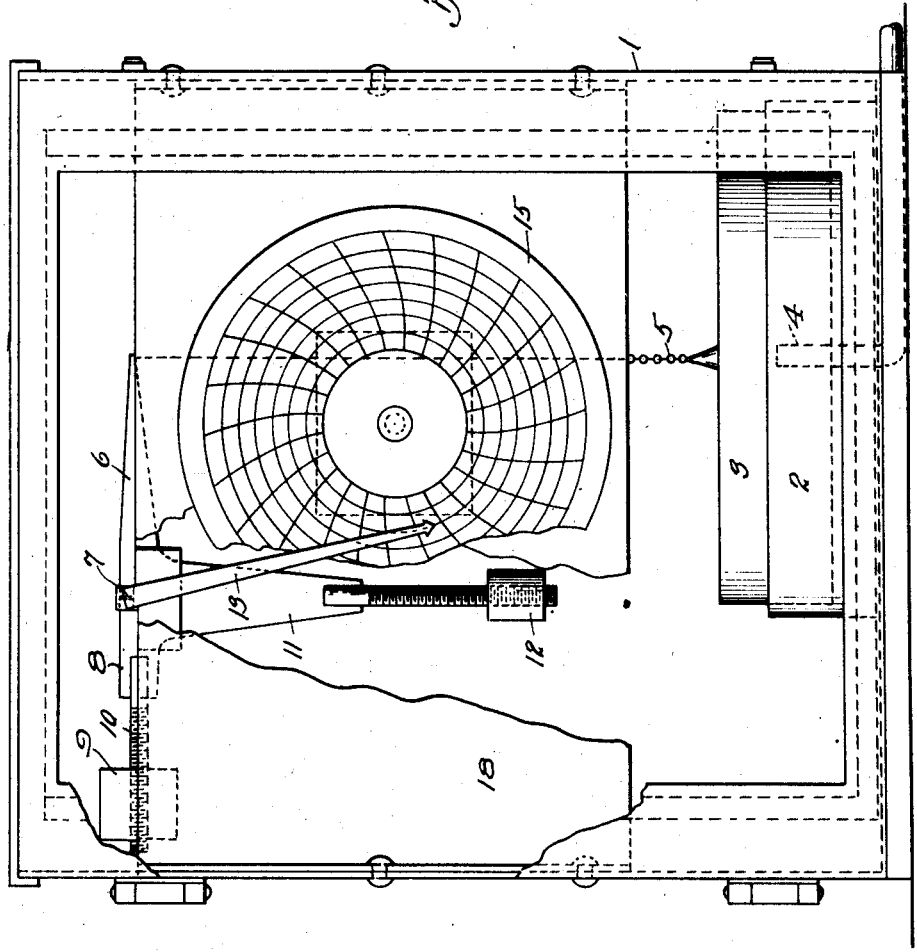
Inventors:
Leban Ellsworth Jones,
Charles Roswold Wraith,
By Byrnes, Townsend & Brickenstein,
Attorneys Patented Sept. 25, 1923.

1,468,943

UNITED STATES PATENT OFFICE.

LABAN ELLSWORTH JONES AND CHARLES ROSWOLD WRAITH, OF ANACONDA, MONTANA.

DRAFT GAUGE.

Application filed March 20, 1920. Serial No. 367,458.

*To all whom it may concern:*

Be it known that we, (1) LABAN ELLSWORTH JONES and (2) CHARLES ROSWOLD WRAITH, citizens of the United States, residing at Anaconda, in the county of Deerlodge and State of Montana, have invented certain new and useful Improvements in Draft Gauges, of which the following is a specification.

This invention relates to measuring, indicating, and recording instruments for the determination of draft pressures.

The main object of this invention, generally stated, is to provide an instrument that will measure, indicate, and record, accurately and instantaneously, draft pressures (positive or negative) through any range of draft pressure variation desired with a liberal movement of the indicating pointer or recording pen for extremely small variations of draft pressure.

A further object of this invention is to provide an instrument of such stability as to make it comparatively non-sensitive to disturbing conditions foreign to the operation of the instrument, such as vibrations, weight of ink in the recording pen, friction of pen on recording chart, and the like.

A further object of this invention is to provide an instrument which can be regulated and calibrated to record extremely small draft pressure variations between any desired draft pressures or throughout a range of draft pressure from positive pressure to negative pressure.

A further object of this invention is to provide an instrument whose novel arrangement, combination, and construction of parts make it possible to transmit minute draft impulses for the automatic regulation and control of combustion regulating apparatus as is described in copending application for Letters Patent, Serial No. 371,540, filed April 5, 1920.

In discussing the principle of this invention, the need for such an instrument as is herein described, its application and limitations, reference is made to each in turn. The principle is practically that of a delicate set of balances, or scales. By the counterbalanced system of levers hereafter described, the difference in weight or pressure of the atmospheric or outside air and the combustion chambers gas, which is communicated to the enclosed chamber of the draft gauge, is actually weighed. This difference in weight is draft pressure and is indicated and recorded as hereafter described. The principle of weighing is accomplished by means of a weight of fixed value moving out from a vertical or neutral position through an arc thus increasing the distance (the sine of the angle of arc subtended) through which it acts.

The draft pressure acting over an area in the enclosed chamber of the draft gauge is multiplied in force by just this area, which force causes the movement of weight through its arc by operating on the other side of the balanced center and is therefore proportionate to the counterbalancing force exerted.

The need for an instrument of the character in metallurgical and industrial operations is recognized when it is understood that in many metallurgical and industrial operations a very slight variation in draft pressure influences the operations to such an extent as to cause upsetting or unbalancing thereof with resultant inefficient operation. In such operations as these a dependable draft measuring instrument, indicating and recording extremely small draft pressure variations by a good liberal movement of the indicating and recording units is essential to correct operation.

An instrument of the character herein described performing its functions as herein stated fills this need, it is believed, to better advantage than any instrument of its kind now on the market, by virtue of its ability to record extremely small draft variation accurately by a good liberal movement of the indicating and recording pen.

Most instruments of this character now on the market have the disadvantage of being extremely delicate and sensitive to outside influences, recording draft pressures of, for instance, one-tenth of an inch water over a space of but one-quarter of an inch or thereabouts on the recording gauge. As many operations require a control with the range of draft pressure within one-tenth of an inch water it is necessary that draft variations be recorded or indicated to one one-hundredths and even to one one-thousandths of an inch water. With the instruments recording a range of one-tenth draft with one-quarter of an inch movement of the recording or indicating pen it is necessary to subdivide this quarter of an inch into ten divisions or 1/40th of an inch for draft pressure readings to 1/100ths of an inch water and into subdivisions of 1/400ths of an inch for readings to 1/1000ths of an inch water. The weight of the ink in the recording pen varies as it is consumed and would alone cause an error in the draft record of as much as 2/100ths or 20% of the total range with an instrument so calibrated.

The advantage of the instrument herein described over the instruments of the kind common on the market is that it is capable of recording draft pressure variations of one-tenth of an inch water over a movement of several inches on the recording chart thus making it possible to subdivide and calibrate the recording chart to read draft pressure variations as small as 1/1000ths of an inch water without the necessity of interpolation.

Application of this instrument can be made to any operation, regardless of the range of draft pressure variation, where a communication can be made between the enclosed chamber of the gauge to the source of draft.

Limitation of this instrument in the indicating and recording of negative draft pressures is a perfect vacuum. As the fundamental principle is that of a pair of scales the size of the instrument and its parts must therefore depend on the range of draft pressure to be weighed.

For a full understanding of the invention reference is had to the accompanying drawings in which Fig. 1 is a plan view of a device embodying the invention, a part being broken away to disclose the working mechanism; and Fig. 2 is a front view thereof, a part being broken away.

The operating mechanism is mounted upon frame members 17 and 18 in a casing 1 having a transparent front. A pan-like receptacle 2 and an inverted somewhat smaller pan-like receptacle 3 together with a suitable sealing liquid, preferably of light oil, define a closed chamber. A draft pipe 4 extends through the receptacle 2 into the chamber to a height sufficient to clear the surface of the sealing liquid. The receptacle 3 is suspended by means of a chain, cable, wire or string 5 from a lever 6 revolving about a knife-edge center 7.

The pan 3, chain 5, lever 6 and in fact all parts whose weight acts on this side of the fulcrum of lever 6 is counterbalanced by weight 9 on arm 8. Adjustment to obtain any balance desired is obtained by screwing weight 9 over the threaded portion 10 of arm 8 in the well known manner.

Another arm 11 extends downwardly from the lever system 6, 8 and carries a weight 12 adjustable thereon similarly to weight 9 on arm 8 to afford a calibration and counterbalance of draft pressures exerted through the lever system.

The draft pipe communicates with the source of draft and is of sufficient diameter to permit a rapid exhaust of the chamber and consequently make the device readily responsive to variations in draft pressure, making the lag in the communication of the draft variation a negligible factor.

An increase in draft pressure, exhausting a portion of the volume from the enclosed chamber, results in a sinking of the inverted pan 3 deeper into the liquid and a downward pull of lever 6 and an angular motion of the whole lever system about its fulcrum until the moment caused by the draft pressure is balanced by weight 12.

This angular motion, which is a direct function of the variation of draft pressure may be indicated and recorded in various ways as for instance by means of the well known Bristol type instrument including an arm 13 carrying a recording pen 14 which contacts with a chart 15 driven by a constant speed motor such as a clock mechanism 16.

Since the arm 13 can be made as long as desired, the amplitude of the oscillations of the pen or other marking point may be made of any desired extent and the smallest pressure variations may be observed with ease. Friction of the pen and length of lever 13 do not affect the operation of the mechanism since the size of the chamber defined by the receptacles 2 and 3 assures considerable momentum for the operation. The effect of friction and irregularities of construction which detrimentally affect the operation of delicate constructions is minimized in the proposed construction.

The structure is rugged and, once calibrated remains in good working order for a considerable length of time.

By manipulation of the weight 9 the lever 6 may be balanced at any desired pressure condition in the chamber. In such balanced condition, the arm 11 which extends vertically downwardly is entirely neutral. When variations of draft pressure take place, the weight 12 increasingly opposes shifting of the lever system from its balanced condition. The movement to both sides of the neutral or normal position is therefore initially considerable even at small changes in pressure and affords an accurate measure of the variations.

While we have disclosed what we consider at the present time a preferred embodiment of the invention, we are fully aware that the inventive idea may be carried out in other ways.

In the foregoing only one form of balance has been shown. It is obvious, however, that other forms may be readily used.

It is also evident that the device disclosed may be readily converted with little changes in the general arrangement, for measuring positive pressures.

We claim:

1. A draft gauge comprising a vessel containing a liquid, a balance, an inverted vessel suspended in the liquid from one arm of the balance, means acting upon the other arm of the balance in all angular positions thereof to counterbalance the force acting upon the first arm at a definite pressure condition within the vessel and a weighing arm connected to the balance at the fulcrum thereof, having a downward vertical position at said pressure condition.

2. A draft gauge comprising a vessel containing a liquid, a balance, an inverted vessel suspended in the liquid from one arm of the balance, an adjustable weight upon the other arm of the balance operative in all angular positions thereof to counterbalance the force acting upon the first arm at a definite pressure condition within the vessel and a weighing arm connected to the balance at the fulcrum thereof, having a downward vertical position at said pressure condition.

3. A draft gauge comprising a vessel containing a liquid, a balance, an inverted vessel suspended in the liquid from one arm of the balance, an adjustable weight upon the other arm of the balance operative in all angular positions thereof to counterbalance the force acting upon the first arm at a definite pressure condition within the vessel and a weighing arm connected to the balance at the fulcrum thereof, said weighing arm having a downward vertical position at said pressure condition and carrying an adjustable weight.

4. A pressure gauge, comprising a balance, pressure-responsive means adapted to exert a force under the influence of a pressure medium, means for causing the said force to act upon one arm of the balance, means on the second arm operative in all angular positions of the balance to counterbalance the force acting upon the first arm at a definite pressure of the pressure medium and means constructed and arranged to act upon the balance with a force equal to zero at equilibrium and to progressively oppose movement of the balance from equilibrium.

In testimony whereof, we affix our signatures.

LABAN ELLSWORTH JONES.
CHARLES ROSWOLD WRAITH.